United States Patent
Cantadori

(10) Patent No.: US 12,442,866 B2
(45) Date of Patent: Oct. 14, 2025

(54) ESTIMATING THE STATE OF HEALTH OF A RECHARGEABLE BATTERY

(71) Applicant: MAHLE International GmbH, Stuttgart (DE)

(72) Inventor: Andrea Cantadori, Parma (IT)

(73) Assignee: MAHLE International GmbH, Stuttgart (DE)

( * ) Notice: Subject to any disclaimer, the term of this patent is extended or adjusted under 35 U.S.C. 154(b) by 176 days.

(21) Appl. No.: 18/459,254

(22) Filed: Aug. 31, 2023

(65) Prior Publication Data
US 2024/0077546 A1    Mar. 7, 2024

(30) Foreign Application Priority Data

Sep. 7, 2022   (EP) .................................. 22194453

(51) Int. Cl.
    *G01R 31/392*    (2019.01)
    *G01R 31/3835*   (2019.01)
    *H02J 7/00*      (2006.01)
    *B60L 53/62*     (2019.01)

(52) U.S. Cl.
    CPC ....... *G01R 31/392* (2019.01); *G01R 31/3835* (2019.01); *H02J 7/0048* (2020.01); *H02J 7/005* (2020.01); *B60L 53/62* (2019.02)

(58) Field of Classification Search
    None
    See application file for complete search history.

(56) References Cited

U.S. PATENT DOCUMENTS

| | | | |
|---|---|---|---|
| 2008/0197807 A1* | 8/2008 | Simopoulos ....... | G01R 31/3835 320/132 |
| 2013/0311017 A1* | 11/2013 | Matsunaga ........... | H01M 10/42 701/22 |
| 2014/0379284 A1* | 12/2014 | Heo .................... | G01R 31/3648 702/63 |
| 2015/0102818 A1 | 4/2015 | Rueger et al. | |
| 2017/0106764 A1* | 4/2017 | Beaston .................. | B60L 58/12 |
| 2020/0180465 A1* | 6/2020 | Watson .................... | B60L 53/14 |
| 2020/0198490 A1* | 6/2020 | Ono ......................... | B60L 50/64 |
| 2023/0382248 A1* | 11/2023 | Sirieix ..................... | B60L 53/12 |

FOREIGN PATENT DOCUMENTS

| CN | 102866361 A | 1/2013 |
|---|---|---|
| CN | 109001636 A | 12/2018 |

* cited by examiner

*Primary Examiner* — Jas A Sanghera
(74) *Attorney, Agent, or Firm* — Maschoff Brennan

(57) ABSTRACT

A method for estimating the State of Health (SoH) of a rechargeable battery. The method may include obtaining a first value of State of Charge of the battery and subjecting the battery to a DC power charging. The method may further include after having performed the DC power charging, obtaining a second value of State of Charge of the battery and computing energy provided to the battery. The method may further include computing the State of Health using the following formula $SoH=(DE)/(SoC_{END}-SoC_{START})$. In some embodiments, DE may be the energy provided to the battery during the DC power charging, $SoC_{START}$ may be the first value of SoC of the battery, and $SoC_{END}$ may be the second value of SoC of the battery.

11 Claims, 3 Drawing Sheets

ESTIMATING THE STATE OF HEALTH OF A RECHARGEABLE BATTERY

FIELD

The present invention relates to a method and a system for estimating the State of Health of a rechargeable battery.

BACKGROUND

Vehicle batteries are subject to ageing which affects the chemical and electrical properties.

Capacity of a battery is specified in ampere hours (Ah) and indicates the charge that the battery contains. At a given battery voltage, a higher capacity means that the battery may store more energy. As a result of ageing, the capacity of vehicle batteries gradually decreases over the service life. At the same time, the internal resistance increases. The energy content is therefore reduced more than the capacity in percentage terms.

The figure of merits of the actual conditions of a battery compared to its nominal conditions is referred to as "State of Health" (SoH). Unlike the "State of Charge" (SoC), which can be determined by measuring the actual charge in the battery, there is no absolute definition of the SoH. On the contrary, the SoH is a key quality indicator that may be related to different performance parameters of the battery. Theoretically, a new battery should have a SoH=100%.

The SoH has great significance when it comes to warranty, second-hand vehicle certification, etc. Diagnostic tools usually give access to several battery parameters, depending on the vehicle manufacturers. The SoH is usually not provided by diagnostic devices.

Document US 2015/0102818 A1 discloses a method and a device for determining the SoH of a vehicle battery, comprising the following steps: complete discharging of the vehicle battery by vehicle-internal loads of the vehicle; complete charging of the vehicle battery; measuring a capacity and/or an energy content of the vehicle battery during the charging of the vehicle battery; determining the battery status by means of the capacity and/or the energy content of the vehicle battery.

Document CN109001636 discloses a method of estimating the SoH of a battery, where the SoH depends on the capacity value, the remaining power change amount, and a preset value.

Document CN102866361 discloses a method for estimating the SoH of a battery, where SoH is a function of voltage, current and state of charge SoC.

As a matter of fact, known methods assume different definitions of the SoH, being indeed not comparable.

There are also known solutions based on the extrapolation of the nominal internal resistance of the battery. These solutions require customized charging stations. In addition, the methods are long and give only a statistical indication, not an actual measure of the internal resistance.

SUMMARY

A method for estimating the State of Health (SoH) of a rechargeable battery. The method may include obtaining a first value of State of Charge of the battery and subjecting the battery to a DC power charging. The method may further include after having performed the DC power charging, obtaining a second value of State of Charge of the battery and computing energy provided to the battery. The method may further include computing the State of Health using the following formula $SoH=(DE)/(SoC_{END}-SoC_{START})$. In some embodiments, DE may be the energy provided to the battery during the DC power charging, $SoC_{START}$ may be the first value of SoC of the battery, and $SoC_{END}$ may be the second value of SoC of the battery.

BRIEF DESCRIPTION OF THE DRAWINGS

Further features and advantages of the present disclosure will become more apparent from the non-limiting description of a method and a system for estimating the State of Health of a rechargeable battery as illustrated in the appended drawings, in which.

DESCRIPTION OF EMBODIMENTS

Figure 1:
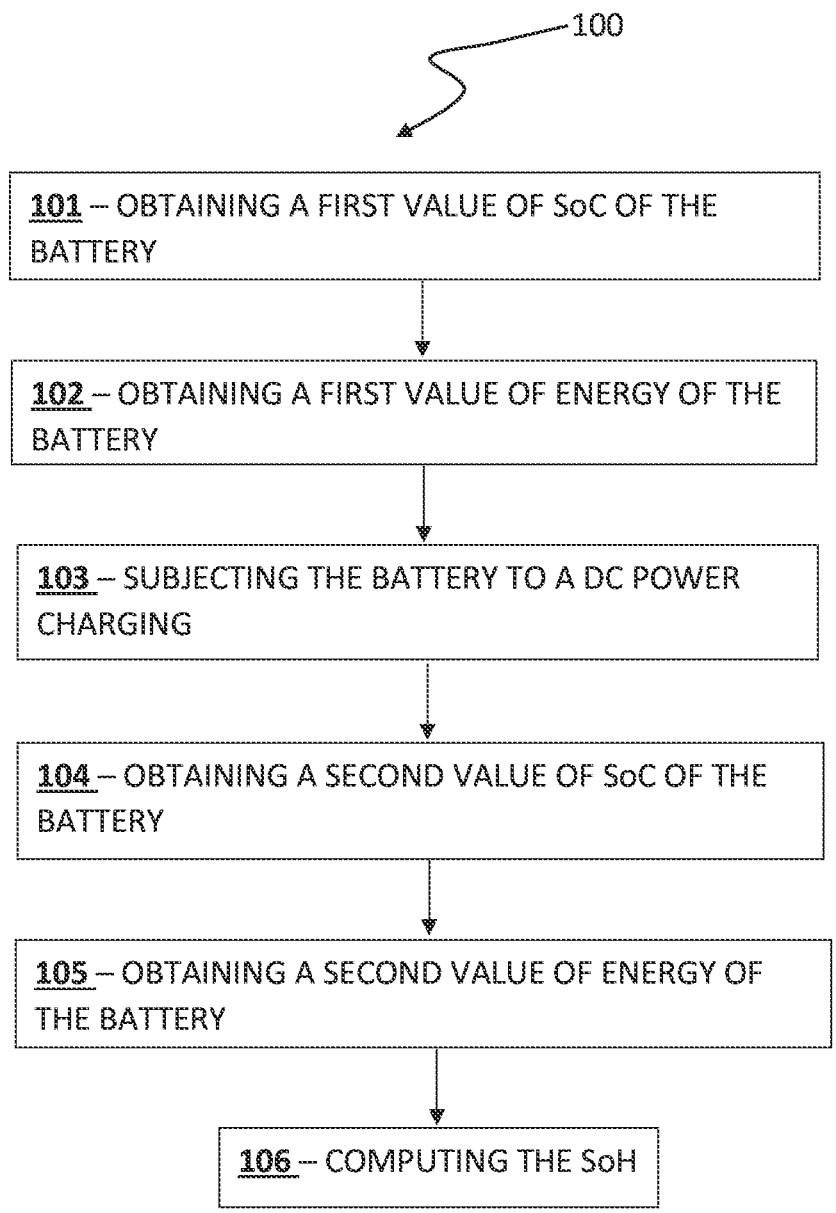
FIG. 1 is a flowchart of a method for estimating the State of Health of a rechargeable battery, for example for a vehicle, according to a first embodiment.

In this context, the technical task underlying the present disclosure is to propose a method and a system for estimating the State of Health of a rechargeable battery, for example for a vehicle, which may assist in overcoming the drawbacks described above.

In some embodiments, an object of the present disclosure is to provide a method and a system for estimating the State of Health of a rechargeable battery, for example for a vehicle, that may be applied to any battery, independently of the manufacturer.

The stated technical task and specified objects are substantially achieved by a method for estimating the State of Health, SoH, of a rechargeable battery, for example for a vehicle, wherein the method comprises the following steps: obtaining a first value of State of Charge of the battery; subjecting the battery to a DC power charging; after having performed the DC power charging, obtaining a second value of State of Charge of the battery; computing energy provided to the battery; computing the State of Health using the following formula: $SoH=(DE)/(SoC_{END}-SoC_{START})$, where DE is the energy provided to the battery during the DC power charging, SoCSTART is the first value of SoC of the battery, and $SoC_{END}$ is the second value of SoC of the battery.

In some embodiments, the first value and the second value of State of Charge of the battery are obtained from an electronic control unit of the vehicle.

In some embodiments, the method further comprises the following steps:
 measuring a DC current provided to the battery during the DC power charging;
 obtaining a voltage value of the battery.

The step of computing energy provided to the battery is carried out as a function of the measured DC current and the voltage value. In some embodiments, the voltage value of the battery is obtained from said electronic control unit. In some embodiments, the method further comprises the following steps: before the DC power charging, obtaining a first value of energy of the battery; after having performed the DC power charging, obtaining a second value of energy of the battery.

The step of computing energy provided to the battery consists in computing the difference between the second value of energy and the first value of energy of the battery.

In some embodiments, the first value and the second value of energy of the battery are obtained from said electronic control unit of the vehicle.

The stated technical task and specified objects are substantially achieved by a system for estimating the State of Health, SoH, of a rechargeable battery, for example for a vehicle, wherein the system comprises:
  a fast-charging station configured to provide a DC power supply to the battery;
  a DC logger having an inlet connected to the fast-charging station and an outlet connectable to the battery, the DC logger being configured to measure a DC current or DC power provided to the battery by the fast-charging station;
  a diagnostic device configured to obtain at least a first value and a second value of SoC of the battery, respectively in two different conditions of charge of the battery, and a voltage value of the battery,
wherein the diagnostic device is configured to:
  communicate with the DC logger so as to obtain the DC current or DC power;
  compute energy DE provided by the fast-charging station to the battery in response to the measured DC current or DC power from the DC logger;
  compute the SoH using the following formula:

$$SoH=(DE)/(SoC_{END}-SoC_{START}),$$

where DE is the energy provided to the battery during the DC power charging, $SoC_{START}$ is the first value of SoC of the battery, and $SoC_{END}$ is the second value of SoC of the battery.

In some embodiments, the fast-charging station is a portable charging station configured to provide to the battery a DC power comprised between 20 kW and 60 kW.

In some embodiments, the fast-charging station is a fixed charging station configured to provide to the battery a DC power higher than 50 kW.

In some embodiments, the DC logger is a DC current meter.

In some embodiments, the DC logger is a DC watt meter.

In some embodiments, the inlet of the DC logger is a type-2 socket compatible for connection with the fast-charging station, and the outlet of the DC logger is a type-2 plug compatible for connection with the vehicle.

With reference to FIG. 1, number 100 indicates a first embodiment of a method for estimating the State of Health (SoH) of a rechargeable battery, indicated as 2. In some embodiments, the term "battery" may indicate a single accumulating cell or a battery pack comprising a plurality of accumulating cells.

The method 100 comprises a step of subjecting the battery 2 to a DC power charging. This step is indicated as 103 in FIG. 1.

This step is carried out by means of connecting the battery 2 to a fast-charging station 3 configured to provide a DC power supply.

In some embodiments, the fast-charging station 3 is a portable charging station configured to provide to the battery 2 a DC power comprised between 20 kW and 60 kW.

In some embodiments, the fast-charging station 3 is a fixed charging station configured to provide to the battery 2 a DC power higher than 50 kW.

It is considered useful to recall that according to the state of the art, there are known two basic charging modes for vehicle rechargeable batteries:
  conventional charging and fast charging.

In conventional charging, also addressed as slow charging, the current can be DC (portable DC machine) or single-phase AC (110V~250V) and three-phase AC (380V). The charging current is generally in the range 8-32 A, and the charging power is generally in the range 1.5-21 kW.

On the contrary, fast charging (also called ground charging) is a DC power supply method for charging vehicle batteries. In some embodiments, fast charging is characterized by current in the range 150-400 A, voltage in the range of 200-750 V, and charging power greater than 50 kW.

The main advantage of fast charging mode is that the voltage is generally greater than the battery voltage, thus reducing the charging time. Inside a fast-charging station there is a rectifier that converts AC power to DC power.

In some embodiments, before subjecting the battery 2 to a DC power charging (step 103), the following steps are carried out:
  step 101: obtaining a first value of State of Charge (SoC) of the battery 2;
  step 102: obtaining a first value of energy of the battery 2.

In some embodiments, the first value of SoC (indicated as $SoC_{START}$) and the first value of energy (indicated as ESTART) are obtained from an electronic control unit (ECU) of the vehicle.

In some embodiments, the first value of SoC and the first value of energy are read from a diagnostic device 4 configured to communicate with ECU of the vehicle. The diagnostic device 4 is of a known type and will not be further described. After having performed steps 101 and 102, the method 100 goes on with the execution of step 103.

After having performed a DC power charging (step 103), the following steps are carried out:
  step 104: obtaining a second value of SoC of the battery 2, at the end of the charging;
  step 105: obtaining a second value of energy of the battery 2, at the end of the charging.

In some embodiments, the second value of SoC (indicated as $SoC_{END}$) and the second value of energy (indicated as EEND) are obtained from the ECU of the vehicle. In some embodiments, the second value of SoC and the second value of energy are read from the diagnostic device 4.

The SoH is then computed at step 106 using the following formula:

$$SoH=(E_{END}-E_{START})/(SoC_{END}-SoC_{START})$$

Figure 2:
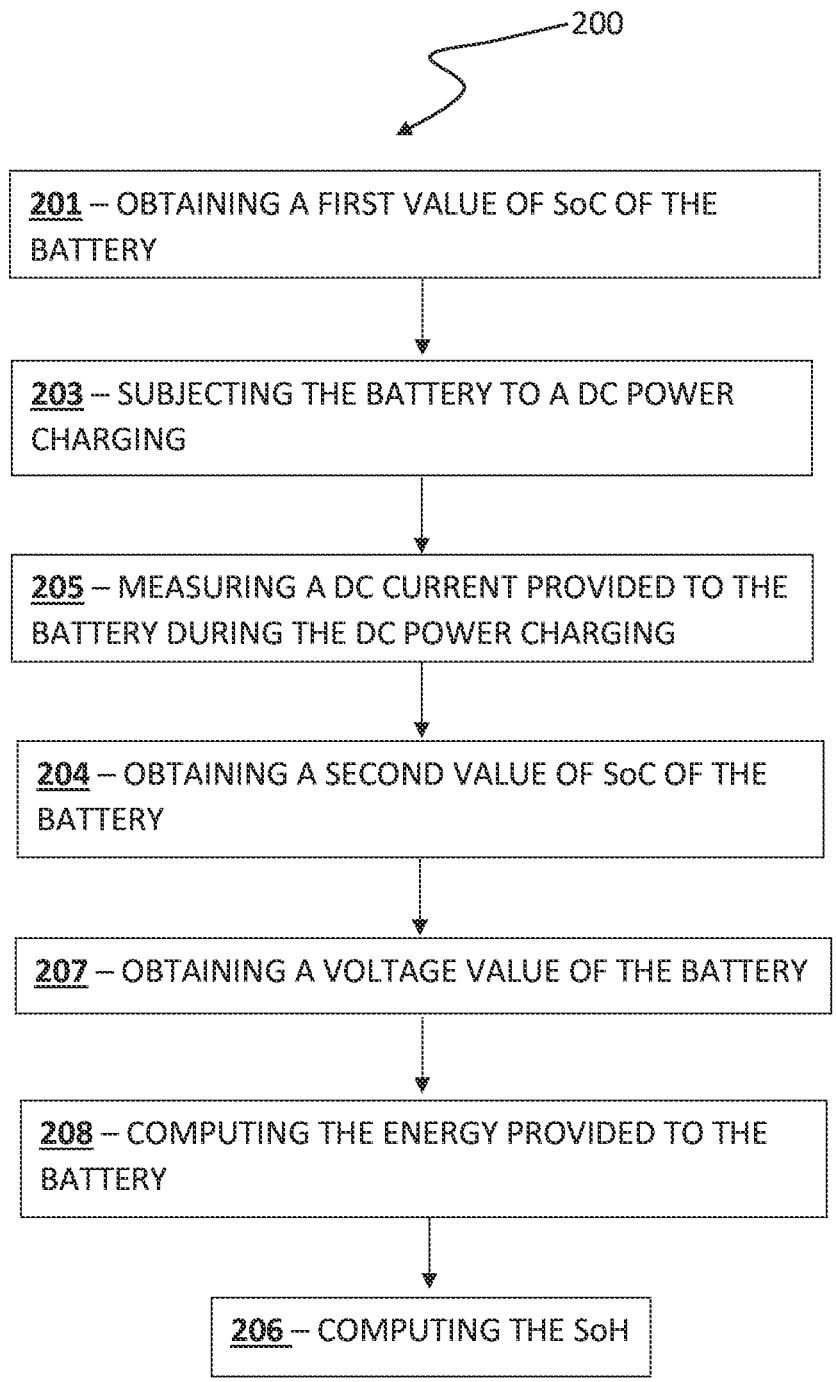
FIG. 2 is a flowchart of a method for estimating the State of Health of a rechargeable battery, for example for a vehicle, according to a second embodiment.

In some embodiments, the diagnostic device 4 is configured to execute the step 106. With reference to FIG. 2, method 200 indicates a second embodiment of a method for estimating the State of Health (SoH) of a rechargeable battery. The method 200 comprises a step of subjecting the battery 2 to a DC power charging. This step is indicated as 203 in FIG. 2. This is exactly the same step as 103 of the first embodiment of the method (see FIG. 1).

Step 203 is indeed carried out by means of connecting the battery 2 to the fast-charging station 3.

In some embodiments, before subjecting the battery to a DC power charging (step 103), a first value of SoC of the battery 2 is obtained. This step is indicated as 201. This is the same step as 101 in some embodiments.

In some embodiments, the first value of SoC (indicated as $SoC_{START}$) is obtained from the ECU of the vehicle.

In some embodiments, the first value of SoC is read from the diagnostic device 4.

After having performed step 201, the method 200 goes on with the execution of step 203.

During the execution of step 203, it is measured a DC current provided by the fast-charging station 3 to the battery 2.

Measuring of the DC current is indicated as step 205.

In some embodiments, a DC logger 5 is used in the second embodiment of the method.

The DC logger 5 has an inlet 5a configured to be connected to the fast-charging station 3 and an outlet 5b configured to be connected to the battery 2 of a vehicle 10.

In some embodiments, the inlet 5a is a type-2 socket compatible for connection with fast-charging stations, and the outlet 5b is a type-2 plug compatible for connection with vehicles.

In some embodiments, the DC logger 5 is a DC current meter that is configured to measure the DC current provided by the fast-charging station 3 to the battery 2.

The method 200 comprises also the following steps:
- step 207: obtaining a voltage value of the battery 2 from the ECU of the vehicle;
- step 208: computing the energy $\int_0^t P(t)dt$ provided to the battery 2 as a function of the measured DC current (measured by the DC logger 5) and of the voltage value of the battery 2.

In some embodiments, the energy is computed referring to the time interval during which the battery 2 is charged by the fast-charging station 3, using the very well-known formulas:

Power $P(t)=V(t) \times I(t)$

Energy $E(t)=\int_0^t P(t)dt$

The energy provided during the charging is referred to as DE, which is the difference between the energy of the battery 2 at the end of the DC charging and the energy of the battery 2 before charging.

After having performed a DC power charging (step 203), a second value of SoC of the battery 2 is obtained. This step is indicated as 204. This may be the same step as 104 in some embodiments.

In some embodiments, the second value of SoC (indicated as $SoC_{END}$) is obtained from the ECU of the vehicle.

In some embodiments, the second value of SoC is read from the diagnostic device 4. The SoH is then computed at step 206 using the following formula:

$SoH=DE/(SoC_{END}-SoC_{START})$.

For example, the DC logger 5 is configured to provide the measured DC current to the diagnostic device 4.

The diagnostic device 4 is also configured to acquire the voltage value of the battery 2 from the ECU (step 207).

Finally, the diagnostic device 4 is configured to compute the energy DE (step 208) and to compute the SoH (step 206).

In some embodiments, the SoH can be read directly on the display of the diagnostic device 4, as other vehicle parameters.

In some embodiments, the method 200 envisages a step of measuring a DC power provided by the fast-charging station 3 to the battery 2, instead of measuring a DC current.

Thus, in this case the DC logger 5 is a watt meter that is configured to measure the DC power provided by the fast-charging station 3 to the battery 2.

In some embodiments, steps 207 is not present, and step 208 consists in computing the energy provided by the battery 2 as a function of the measured DC power in the time interval of charging the battery 2.

Figure 3:
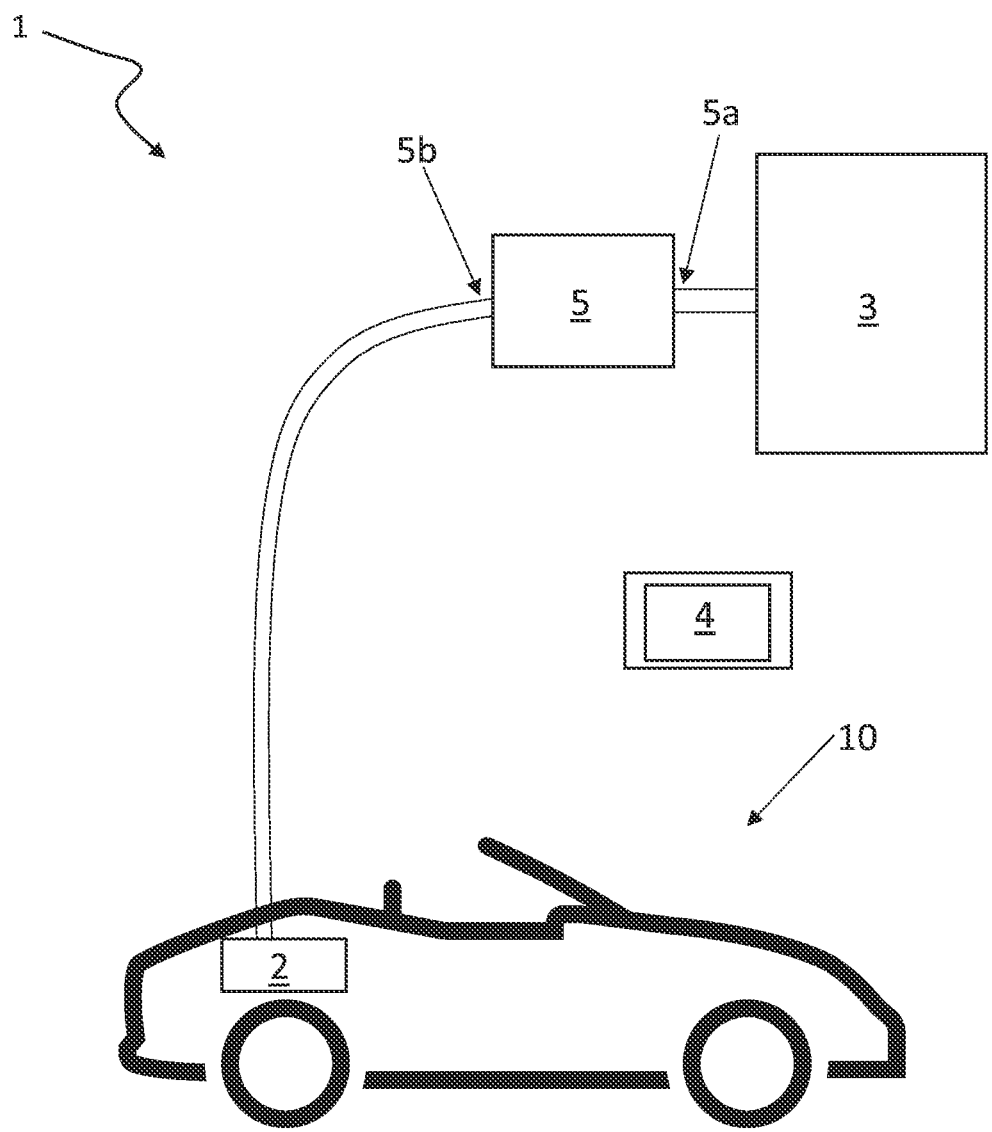
FIG. 3 schematically illustrates a system for estimating the State of Health of a rechargeable battery for example for a vehicle.

With reference to FIG. 3, number 1 indicates a system for estimating the SoH of a rechargeable battery.

The system 1 comprises: the fast-charging station 3 configured to provide a DC power supply to the battery 2; the DC logger 5 having an inlet 5a connected to the fast-charging station (3) and an outlet 5b connectable to the battery 2; the diagnostic device 4 that is configured to communicate with the DC logger 5 and is connectable (preferably wireless) with the ECU of the vehicle 10. In some embodiments, the DC logger 5 is configured to measure a DC current or a DC power provided to the battery 2 by the fast-charging station 3. The diagnostic device 4 is configured to obtain the following values: the first value of SoC of the battery 2 (that is $SoC_{START}$); the second value of SoC of the battery 2 (that is $SoC_{END}$); the voltage value of the battery 2.

In some embodiments in the system of FIG. 3, the diagnostic device 4 is also configured to: compute the energy DE provided by the fast-charging station 3 to the battery 2 in response to the measured DC current received from the DC logger 5; compute the SoH according to the formula: $SoH=DE/(SoC_{END}-SoC_{START})$. In some embodiments, while in the first embodiment the two instantaneous energy values $E_{START}, E_{END}$ are obtained by the diagnostic device 4, in the second embodiment the energy DE provided is computed on the basis of a measure, either a DC current or a DC power measured by the DC logger 5.

In some embodiments, it may be stated that the formula for obtaining the SoH is the same for the two embodiments, since $DE=E_{END}-E_{START}$.

The characteristics of the method and system for estimating the State of Health of a rechargeable battery for a vehicle, emerge clearly from the above description, as do the advantages.

In some embodiments, the method allows to give a quantity determination of SoH for any battery, starting from parameters obtained directly from the diagnostic tool.

In some embodiments, the system uses a universal DC logger that is able to measure the DC current provided to the battery. This is sent to the diagnostic tool, so allowing to compute the SoH for any vehicle battery.

The method may be simple, quick, and easy to be executed because it uses fast-charging stations already on the market, avoiding providing customized charging stations as in methods based on the extrapolation of the internal resistance (parameter that is usually not declared by manufacturers).

In some embodiments, the various features illustrated in the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements.

Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A method for estimating a State of Health (SoH) of a battery of a vehicle, the battery being rechargeable, the method comprising:
   obtaining a first value of State of Charge of the battery;
   subjecting the battery to DC power charging by connecting the battery to a fast-charging station configured to provide a DC power supply to the battery, the fast-charging station being configured to provide 150-400 A of current, 200-750 V of voltage, and greater than 50 kW of charging power;
   measuring one or more of DC current and DC power provided to the battery during DC power charging by a DC logger having an inlet configured to connect to the fast-charging station and an outlet configured to connect to the battery;
   after having performed the DC power charging, obtaining a second value of the State of Charge of the battery, the first value and the second value of the State of Charge of the battery being obtained from a diagnostic device configured to communicate with an electronic control unit of the vehicle;
   in response to the DC current being measured, obtaining a voltage value of the battery by the diagnostic device;
   computing energy provided to the battery as a function of one or more of:
      measured DC current and the voltage value, and
      measured DC power in a time interval of charging the battery,
      the step of computing the energy being performed by the diagnostic device; and
   computing the State of Health using the following formula:

$$SoH = (DE)/(SoC_{END} - SoC_{START}),$$

where DE is the energy provided to the battery during the DC power charging, $SoC_{START}$ is the first value of SoC of the battery, and $SoC_{END}$ is the second value of SoC of the battery, the step of computing the State of Health being performed by the diagnostic device.

2. The method according to claim 1, further comprising:
   before the DC power charging, obtaining a first value of energy of the battery; and
   after having performed the DC power charging, obtaining a second value of the energy of the battery,
   wherein the step of computing energy provided to the battery includes computing a difference between the second value of the energy and the first value of the energy of the battery.

3. The method according to claim 2, wherein the first value and the second value of the energy of the battery are obtained from said electronic control unit of the vehicle.

4. A system for estimating a State of Health (SoH) of a battery of a vehicle, the battery being rechargeable, the system comprising:
   a fast-charging station configured to provide a DC power supply to the battery;
   a DC logger having an inlet connected to the fast-charging station and an outlet connectable to the battery, said DC logger being configured to measure a DC current or DC power provided to the battery by the fast-charging station; and
   a diagnostic device configured to obtain at least a first value and a second value of SoC of the battery, respectively in two different conditions of charge of the battery, and a voltage value of the battery, the diagnostic device is configured to:
      communicate with the DC logger so as to obtain the DC current or DC power;
      compute energy DE provided by the fast-charging station to the battery in response to the measured DC current or DC power from the DC logger; and
      compute the SoH using the following formula:

$$SoH = (DE)/(SoC_{END} - SoC_{START}),$$

where the DE is the energy provided to the battery during the DC power charging, $SoC_{START}$ is the first value of SoC of the battery, and $SoC_{END}$ is the second value of SoC of the battery.

5. The system according to claim 4, wherein the fast-charging station is a portable charging station configured to provide to the battery a DC power comprised between 20 kW and 60 kW.

6. The system according to claim 4, wherein the DC logger is a DC current meter.

7. The system according to claim 4, wherein the DC logger is a DC watt meter.

8. The system according to claim 4, wherein the inlet of the DC logger is a type-2 socket compatible for connection with the fast-charging station, and the outlet of the DC logger is a type-2 plug compatible for connection with the vehicle.

9. One or more non-transitory computer-readable media configured to store instructions that, in response to being executed by a system, cause or direct the system to perform operations for estimating a State of Health (SoH) of a battery of a vehicle, the battery being rechargeable, the operations comprising:
obtaining a first value of State of Charge of the battery;
subjecting the battery to DC power charging by connecting the battery to a fast-charging station configured to provide a DC power supply to the battery, the fast-charging station being configured to provide 150-400 A of current, 200-750 V of voltage, and greater than 50 kW of charging power;
measuring one or more of DC current and DC power provided to the battery during DC power charging by a DC logger having an inlet configured to connect to the fast-charging station and an outlet configured to connect to the battery;
after having performed the DC power charging, obtaining a second value of the State of Charge of the battery, the first value and the second value of the State of Charge of the battery being obtained from a diagnostic device configured to communicate with an electronic control unit of the vehicle;
in response to the DC current being measured, obtaining a voltage value of the battery by the diagnostic device;
computing energy provided to the battery as a function of one or more of:
measured DC current and the voltage value, and
measured DC power in a time interval of charging the battery,
the step of computing the energy being performed by the diagnostic device; and
computing the State of Health of the battery using the following formula:

$$SoH=(DE)/(SoC_{END}-SoC_{START}),$$

where DE is the energy provided to the battery during the DC power charging, $SoC_{START}$ is the first value of SoC of the battery, and $SoC_{END}$ is the second value of SoC of the battery, the step of computing the State of Health being performed by the diagnostic device.

10. The one or more non-transitory computer-readable media according to claim 9, wherein the operations further comprise:
before the DC power charging, obtaining a first value of energy of the battery; and
after having performed the DC power charging, obtaining a second value of energy of the battery,
wherein the step of computing energy provided to the battery includes computing a difference between the second value of energy and the first value of energy of the battery.

11. The one or more non-transitory computer-readable media according to claim 10, wherein the first value and the second value of energy of the battery are obtained from said electronic control unit of the vehicle.

* * * * *